No. 756,995. PATENTED APR. 12, 1904.
S. F. VANCE.
SPRING TOOTH FOR CULTIVATORS AND HARROWS.
APPLICATION FILED JULY 7, 1903.
NO MODEL.

Witnesses
C. H. Walker
J. W. Moore

Inventor
Sidney F. Vance
By Eugene W. Johnson
Attorney

No. 756,995. Patented April 12, 1904.

UNITED STATES PATENT OFFICE.

SIDNEY F. VANCE, OF SALMON, TEXAS, ASSIGNOR OF ONE-HALF TO LORENZO D. WOODARD, OF ELKHART, TEXAS.

SPRING-TOOTH FOR CULTIVATORS AND HARROWS.

SPECIFICATION forming part of Letters Patent No. 756,995, dated April 12, 1904.

Application filed July 7, 1903. Serial No. 164,561. (No model.)

*To all whom it may concern:*

Be it known that I, SIDNEY F. VANCE, a citizen of the United States, residing at Salmon, in the county of Anderson and State of Texas, have invented new and useful Improvements in Spring-Teeth for Cultivators and Harrows, of which the following is a specification.

This invention relates to improvements in spring-teeth for cultivators and harrows, the object being to provide a tooth for such types of agricultural implements, and in carrying my invention into effect each tooth is made from a single piece of flat metal which is shaped by being bent upon itself to provide at its front upper portion a spring member and below, as well as to the rear of such spring member, a curved depending and forward-extending portion, such construction providing a tooth which in use will first bend at its forward part, retaining the configuration of the depending part, and when sufficient pressure is applied the lower end, which enters the soil, will be moved rearward. In practice the teeth are attached to a supporting-frame in gangs, and by changing the inclination of the supporting-frame the teeth may be caused to lightly engage the soil or to enter the same to a considerable depth, as will be hereinafter set forth.

Figure 1:
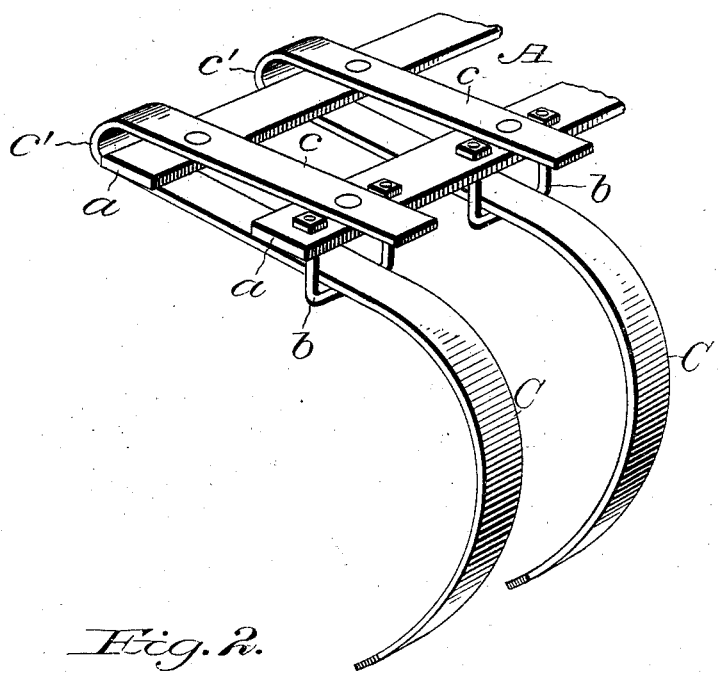
Figure 2:
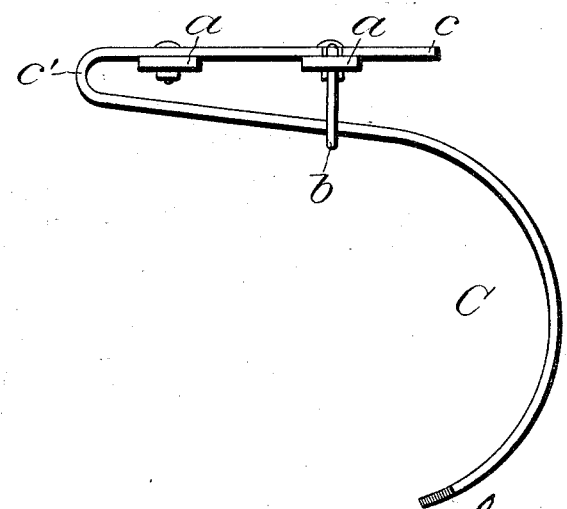

In the drawings which illustrate the invention, Figure 1 is a perspective view showing a number of teeth attached to a supporting-frame, and Fig. 2 is a side elevation.

The supporting-frame A is preferably provided with a pair of bars *a a*, there being attached to the rear bars loops or bails *b b*, through which passes a movable portion of the spring-teeth C. The teeth C C through the upper portions *c* have apertures for the passage of bolts by means of which the teeth are secured to the frame. Each tooth is bent to provide return-bends *c'*, from which extends the portion of the tooth which is passed through the bail, the tooth beyond the bail being curved in the segment of a circle, the lower end being pointed and maintained so that the pointed end will be below and considerably to the rear of the upper part, which is made fast to the frame. When the pointed lower ends of the spring-teeth engage with the ground, they will have a spring movement between the supporting-frame and the bails, providing for an upward movement of the teeth before the segmentally-curved part bends to any appreciable extent. The construction shown insures each tooth entering the ground to the same depth, and in case an obstruction is in the path of a tooth the spring will bend and pass over the same, if not too large. By changing the angle or inclination of the supporting-bars or the frame carrying the bars the teeth may be caused to drag on the ground or to enter the same and make furrows of a considerable depth.

Having thus set forth my invention, what I claim as new, and desire to secure by Letters Patent, is—

The combination with a pair of flat tooth-supporting bars, and bails attached to the rear bar to depend therefrom, of spring-teeth each tooth comprising a single piece of flat metal shaped to provide at the forward portion a return-bend, diverging portions which extend rearward from the return-bend, means for attaching the upper portion of the tooth to each of the supporting-bars, the tooth being passed through the bail which is attached to depend from the rear supporting-bar, substantially as shown and for the purpose set forth.

In testimony whereof I affix my signature in the presence of two witnesses.

SIDNEY his X F. VANCE.
mark

Witnesses:
C. J. HORN,
E. KENNEDY.